(12) United States Patent
Rossius

(10) Patent No.: US 11,444,692 B2
(45) Date of Patent: Sep. 13, 2022

(54) OPTICAL WIRELESS COMMUNICATION SYSTEM

(71) Applicant: pureLiFi Limited, Edinburgh (GB)

(72) Inventor: Arne Rossius, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 0 days.

(21) Appl. No.: 16/479,888

(22) PCT Filed: Jan. 24, 2018

(86) PCT No.: PCT/GB2018/050202
§ 371 (c)(1),
(2) Date: Jul. 22, 2019

(87) PCT Pub. No.: WO2018/138495
PCT Pub. Date: Aug. 2, 2018

(65) Prior Publication Data
US 2021/0194584 A1    Jun. 24, 2021

(30) Foreign Application Priority Data
Jan. 24, 2017  (GB) .................................... 1701209

(51) Int. Cl.
*H04B 10/114*   (2013.01)
*H04B 10/516*   (2013.01)
(Continued)

(52) U.S. Cl.
CPC ....... *H04B 10/116* (2013.01); *H04B 10/1143* (2013.01); *H04B 10/25* (2013.01); *H04B 10/516* (2013.01); *H04B 10/66* (2013.01); *H05B 45/10* (2020.01); *H05B 45/30* (2020.01); *H05B 47/195* (2020.01); *H05B 45/12* (2020.01); *H05B 45/18* (2020.01)

(58) Field of Classification Search
CPC .............................................. H04B 10/11–116
USPC ................................. 398/103, 118–131, 172
See application file for complete search history.

(56) References Cited

U.S. PATENT DOCUMENTS

| 6,504,634 B1* | 1/2003 | Chan ................... H04B 10/1125 398/129 |
| 9,319,134 B2* | 4/2016 | Walewski .......... H04B 10/1141 |
(Continued)

FOREIGN PATENT DOCUMENTS

| CN | 101814955 A | 8/2010 |
| EP | 2893777 A1 | 9/2015 |
(Continued)

*Primary Examiner* — Li Liu
(74) *Attorney, Agent, or Firm* — Womble Bond Dickinson (US) LLP

(57) ABSTRACT

An optical wireless communication system comprises a signal providing apparatus configured to provide a data signal, a driver apparatus separate from the signal providing apparatus and coupled to the signal providing apparatus by a signal cable, wherein the driver apparatus is configured to receive the data signal via the signal cable and to process the data signal to produce a driving signal, and a luminaire comprising a modulateable light source, wherein the modulateable light source is configured to be driven by the driving signal, thereby to produce modulated light, wherein the driver apparatus is positioned adjacent to or within the luminaire.

32 Claims, 5 Drawing Sheets

(51) Int. Cl.
*H04B 10/116* (2013.01)
*H05B 47/195* (2020.01)
*H05B 45/10* (2020.01)
*H04B 10/25* (2013.01)
*H04B 10/66* (2013.01)
*H05B 45/30* (2020.01)
*H05B 45/12* (2020.01)
*H05B 45/18* (2020.01)

(56) References Cited

U.S. PATENT DOCUMENTS

| | | | |
|---|---|---|---|
| 9,774,398 B2 | 9/2017 | Fei et al. | |
| 9,780,874 B2* | 10/2017 | Liu | H04L 9/3226 |
| 10,570,614 B2 | 2/2020 | Rotter | |
| 2006/0056855 A1* | 3/2006 | Nakagawa | H05B 47/195 |
| | | | 398/183 |
| 2006/0239689 A1* | 10/2006 | Ashdown | H05B 45/22 |
| | | | 398/130 |
| 2008/0185969 A1* | 8/2008 | Vegter | H05B 47/165 |
| | | | 315/158 |
| 2009/0196613 A1* | 8/2009 | Linnartz | H04B 10/11 |
| | | | 398/78 |
| 2009/0214225 A1* | 8/2009 | Nakagawa | H04B 10/116 |
| | | | 398/191 |
| 2011/0052210 A1* | 3/2011 | Riedl | H04B 10/1149 |
| | | | 398/189 |
| 2011/0069960 A1* | 3/2011 | Knapp | H04L 12/437 |
| | | | 398/103 |
| 2011/0222849 A1* | 9/2011 | Han | H04B 10/116 |
| | | | 398/25 |
| 2011/0229130 A1* | 9/2011 | Yokoi | H04B 10/116 |
| | | | 398/43 |
| 2012/0230703 A1* | 9/2012 | Yamada | H04B 10/116 |
| | | | 398/172 |
| 2012/0281879 A1* | 11/2012 | Vlutters | G06K 9/2036 |
| | | | 382/103 |
| 2013/0026942 A1* | 1/2013 | Ryan | H05B 47/195 |
| | | | 315/224 |
| 2013/0027576 A1* | 1/2013 | Ryan | H04W 4/33 |
| | | | 348/222.1 |
| 2014/0009063 A1* | 1/2014 | Cregg | H05B 47/19 |
| | | | 315/34 |
| 2014/0241735 A1* | 8/2014 | Bohler | H04B 10/116 |
| | | | 398/186 |
| 2015/0098709 A1* | 4/2015 | Breuer | G06T 7/90 |
| | | | 398/118 |
| 2015/0132006 A1* | 5/2015 | Inoue | F21K 9/20 |
| | | | 398/118 |
| 2015/0147067 A1* | 5/2015 | Ryan | H04W 4/02 |
| | | | 398/118 |
| 2015/0305122 A1* | 10/2015 | Saes | H05B 45/50 |
| | | | 315/129 |
| 2016/0080089 A1* | 3/2016 | Fei | H04B 10/524 |
| | | | 398/118 |
| 2016/0091217 A1* | 3/2016 | Verberkt | H05B 45/325 |
| | | | 700/276 |
| 2016/0119060 A1* | 4/2016 | Byers | H04B 10/27 |
| | | | 398/130 |
| 2016/0226593 A1* | 8/2016 | Ganick | H04B 10/116 |
| 2017/0364348 A1* | 12/2017 | Klitenik | H05B 45/12 |
| 2018/0076892 A1* | 3/2018 | Brilman | H04B 10/67 |
| 2018/0205458 A1* | 7/2018 | Hixon | H04B 10/502 |

FOREIGN PATENT DOCUMENTS

| | | |
|---|---|---|
| EP | 2999144 A1 | 3/2016 |
| JP | 2011192932 A | 9/2011 |
| KR | 1020120019710 A | 8/2010 |
| WO | 2006/123697 A1 | 11/2006 |
| WO | 2010/062094 A2 | 6/2010 |
| WO | 2015077767 A1 | 5/2015 |
| WO | 2016/146377 A1 | 9/2016 |

* cited by examiner

OPTICAL WIRELESS COMMUNICATION SYSTEM

This application is the national phase of International Application No. PCT/GB2018/050202, filed on Jan. 24, 2018, which claims priority to and the benefit of United Kingdom Provisional Patent Application No. 1701209.7, filed on Jan. 24, 2017, the disclosures of which are hereby incorporated by reference herein in their entireties.

FIELD

The present invention relates to an optical wireless communication system, for example a LiFi system.

BACKGROUND

It is known to provide wireless data communications by using visible light (or infrared or ultraviolet light) instead of radio frequencies to transmit and receive data wirelessly between devices. Data may be transmitted using light by modulating an intensity of the light. The light used may be coherent or incoherent. Methods that use light to transmit data wirelessly may be referred to as visible light communications (VLC) or optical wireless communications (OWC).

Wireless networks using visible light may in some circumstances allow a higher data capacity and greater energy efficiency than radio frequency wireless networks, and may also be used to replace point-to-point infrastructure in locations where conventional infrastructure does not exist or is too expensive to build.

LiFi (light fidelity) is a form of visible light communication which may in some circumstances be considered to be analogous to WiFi (wireless fidelity) in radio-frequency communications. A LiFi access point (AP) may send transmit data to, and receive data from, one or more stations using modulated light. The transmission link from the AP to the station or stations may be referred to as a forward link. The transmission link from the station or stations to the AP may be referred to as a return link.

FIG. 1 is a schematic illustration of an existing LiFi system 10. The LiFi system comprises a LiFi unit 12 connected to a luminaire 14 by a wire 16. The luminaire 14 comprises one or more LEDs (not shown).

The LiFi unit 12 is configured to receive input data (for example, Ethernet data) via a LAN cable 18. The LiFi unit 12 is configured to receive power via a power cable 20.

The LiFi unit 12 comprises driver circuitry (not shown) which is configured to produce a driving current which encodes the input data.

The driver current is transmitted via the wire 16 to the luminaire, where it drives one or more LEDs of the luminaire. The driver current may reach values of 1A or more.

The LED driving circuitry is selected to be high bandwidth in order to drive the LED or LEDs of the luminaire with the data to be transmitted while delivering sufficient current for the desired light output.

In the system of FIG. 1, the length of the wire 16 is typically at least 20 to 30 cm when the LiFi unit 12 and luminaire 14 are mounted side-by-side, as shown in FIG. 1. The length of the wire 16 is dependent on installation constraints. In the system of FIG. 1, the length of the wire 16 is dependent on the positioning of the LiFi unit 12 and luminaire 14, which are placed side-by-side. The length of the wire 16 is also dependent on the size of the luminaire 14.

It has been found that transmitting the driver current through the wire 16 may significantly degrade the driver current signal. A signal bandwidth that can be transmitted via the wire 16 may decrease with the length of the wire. An increased length of wire 16 may result in greater parasitic induction in the wire 16. Therefore, more power may be needed on the driver side to drive the wire parasitics in addition to the power required to drive the LEDs. Wire inductance resists current change. Therefore, the increase in wire parasitics with length may be greater at higher frequencies (at which a faster change of current is required) than at lower frequencies.

In addition, large high-frequency current swings in the cable 16 between the LiFi unit 12 and the luminaire 14 may cause significant electromagnetic interference (EMI) radiation from the cable 16.

SUMMARY

In a first aspect of the invention, there is provided an optical wireless communication system comprising: a signal providing apparatus configured to provide a data signal; a driver apparatus separate from the signal providing apparatus and coupled to the signal providing apparatus by a signal cable, wherein the driver apparatus is configured to receive the data signal via the signal cable and to process the data signal to produce a driving signal; and a luminaire comprising a modulateable light source, wherein the modulateable light source is configured to be driven by the driving signal, thereby to produce modulated light; wherein the driver apparatus is positioned adjacent to or within the luminaire. The processing of the data signal may comprise amplifying the data signal. The processing of the data signal may comprise applying a gain to the signal, for example a gain of less than, equal to or more than 1.

By positioning the driver apparatus adjacent to or within the luminaire, performance of the system may be improved. Signal degradation in the signal cable may be reduced.

In some circumstances, signal degradation may be minimal. Producing the driving signal in a driver apparatus adjacent to or within the luminaire may reduce power consumption and/or power losses. Signal bandwidth may be better than if the driver apparatus were positioned further from the luminaire.

The signal cable connecting the signal providing apparatus and driver apparatus may transmit a lower-power signal than is transmitted by an apparatus, for example a LiFi unit, that includes a driver. By using a stand-alone driver apparatus, a relatively long cable between an apparatus having an integrated driver and a luminaire may be replaced by a low-power signal cable between a signal generating apparatus and a stand-alone driver apparatus, and a relatively short cable between the stand-alone driver apparatus and the luminaire. The length of cable between the stand-alone driver apparatus and the luminaire is lower due to the closeness of the stand-alone driver and the luminaire. The length of cable between the stand-alone driver and apparatus may result in reduced inductance when compared with a cable that connects an apparatus with integrated driver to a luminaire.

Positioning the driver apparatus near the luminaire may allow amplification to occur near the luminaire, such that the data signal may be transmitted as a low-power signal. This may allow the use of low-power high-speed signal cable. A low-power signal cable may result in reduced electromagnetic interference (EMI) when compared with a higher-power signal.

The modulation of the modulated light (for example variation in frequency or amplitude of the light) may represent the data signal and/or data represented by the data signal.

The modulated light may comprise modulated visible light. Alternatively, the modulated light may comprise modulated infra-red or ultraviolet light. The data signal may comprise a communication signal, for example in accordance with a selected communication protocol.

The modulated light may be of power sufficient for general lighting purposes, for example to illuminate a room or part of a room. The light source may have an output power in a range 0.1 W to 100 W, optionally 1 W to 50 W.

The signal providing apparatus may comprise a housing. The driver apparatus may be external to the housing of the signal providing apparatus. The driver apparatus may comprise a housing different from the housing of the signal providing apparatus.

The use of a driver apparatus separate from the signal providing apparatus may allow the driver apparatus to be tailored to an individual luminaire. Driver apparatuses may be interchangeable depending on the luminaire used.

The driver apparatus may be provided within the luminaire.

Providing the driver apparatus within the luminaire may mean that no external wires may be used to connect the driver apparatus and luminaire. Power losses may be reduced. Providing the driver apparatus within the luminaire may be cost-efficient. Providing the driver apparatus within the luminaire may provide a simpler system. The system may have a reduced part count.

The driver apparatus may be included on a printed circuit board (PCB). The modulateable light source may also be included on the same PCB.

Integrating the driver apparatus on the same PCB as the modulateable light source may reduce power requirements and/or may make manufacture more efficient.

The driver apparatus and modulateable light source may be integrated in a single package.

The driver apparatus may be included on a first chip. The modulateable light source may be included on a second chip. The first and second chips may be included in a single package.

The driver apparatus and modulateable light source may be provided on a single chip.

If the modulateable light source and driver are provided into an IC or single package, the driver apparatus may be purpose-designed for the characteristics of a particular type of light source technology used. Purpose-designing the driver apparatus may maximise performance.

The system may further comprise a receiver included in the driver apparatus and/or luminaire. The receiver may be configured to receive modulated light, for example from a further source remote from the luminaire.

Including a receiver into the driver and/or luminaire may allow modulated light to be received in the same location as modulated light is transmitted (which may be separate and at considerable distance from the location of the signal providing apparatus).

The system may further comprise at least one further driver apparatus and further luminaire. A further receiver may be integrated into the further driver apparatus and/or further luminaire. Providing multiple receivers may increase a coverage area for a return link.

The receiver may be configured to receive modulated infra-red or visible light. The modulated light provided by the modulateable light source may comprise or represent data represented by the data signal and may be for transmission to at least one further device. The modulated light received by the receiver may be received from said at least one further device, or at least one other further device. The received modulated light may comprise or represent data, for example data generated by said at least one further device.

The receiver may be configured to generate a signal representative of said received modulated light and/or said data represented by said received modulated light. The receiver may be configured to transmit the signal representative of said modulated light and/or said data represented by said received modulated light via said signal cable. The receiver may be configured to transmit the signal representative of said modulated light and/or said data represented by said received modulated light via a further signal cable. The further signal cable may be separate from the signal cable used to transmit the data signal to the driver apparatus. The receiver and/or the driver apparatus may be configured to process said signal generated by the receiver. The processing of said signal generated by the receiver may comprise amplifying said signal generated by the receiver.

The receiver may be provided on the same chip and/or on the same PCB and/or in the same housing as the driver apparatus and modulateable light source.

The data signal may comprise a digital signal. The driver apparatus may comprise a digital to analog converter.

In some circumstances, a digital signal may be less sensitive to external EMI than an analog signal. Transmitting a digital data signal on the signal cable may reduce EMI when compared to transmitting an analog signal.

The modulateable light source may be dimmable. Dimming functionality may be provided by the driver apparatus. The driver apparatus may comprise an adjustable gain/attenuation component and the dimming functionality may be provided using the adjustable gain/attenuation component. Dimming information may be encoded in the data signal.

The driver apparatus may comprise an amplifier for performing the processing of the data signal. The processing of the data signal may comprise amplifying the data signal after the digital to analog conversion.

The data signal may comprise an analog signal.

Transmitting an analog signal on the signal cable may allow for a simpler driver apparatus which does not include a digital to analog converter. The driver apparatus may be more cost efficient than a driver apparatus that includes a digital to analog converter.

The signal cable may comprise fibre optic cable or electrical cable.

A fibre optic cable may be insensitive to EMI. The data signal may therefore be unaffected by external EMI. Furthermore, the fibre optic cable may not radiate.

Therefore using a fibre optic cable may improve the security of the data transmission over the signal cable. The data signal may comprise an optical signal for transmission via the fibre optic cable. The driver apparatus may comprise an electro-optical converter apparatus for converting the optical data signal to an electrical signal.

An electrical impedance of the signal cable may be matched to an impedance of the signal providing apparatus and/or an impedance of the driver apparatus.

Using a signal cable with an impedance matched to an impedance of the signal providing apparatus and/or an impedance of the driver apparatus may result in reduced signal degradation. In some circumstances, signal degradation may be minimal even in long runs of cable.

The driver apparatus and/or luminaire may comprise an optical feedback apparatus configured to detect modulated light produced by the modulateable light source and provide a feedback signal to the driver apparatus.

The optical feedback apparatus may comprise a photosensor configured to sense light output from the modulateable light source. The optical feedback apparatus may be configured to feed a signal representative of the sensed light output into the driver apparatus. The driver apparatus may be configured to adjust the driving signal in dependence on the signal representative of the sensed light output.

The optical feedback apparatus or at least part of the optical feedback apparatus may be provided on the same chip and/or the same chip package and/or on the same PCB and/or in the same housing as the driver apparatus and modulateable light source.

The driver apparatus may be configured to control an amount of amplification and/or an amplitude of the modulated light in dependence on the feedback signal.

The driver apparatus may be configured to vary the amount of amplification in dependence on the feedback signal thereby to maintain substantially constant an amplitude of the modulated light.

The optical feedback apparatus may be configured to linearise the modulateable light source. The optical feedback apparatus may be configured to compensate for a change in the performance of the modulateable light source, for example a change in performance of the modulateable light source with heating of the modulateable light source and/or with variation of at least one other condition or property of the modulateable light source.

A length of the signal cable between the signal providing apparatus and the driver apparatus may be at least 10 cm, optionally at least 20 cm, further optionally at least 50 cm, further optionally at least 1 metre.

By positioning the driver apparatus adjacent to or within the luminaire, a lower-power signal may be used within the cable. Transmission losses in the cable may be reduced.

The signal cable may comprise a low-power data connection. The data signal may have a peak current at a current level between 1 mA and 500 mA, optionally between 1 mA and 100 mA, further optionally between 1 mA and 50 mA, further optionally less than 1 mA. The driving signal may have a peak current at a current level of at least 1 A. Current may be expressed as a peak or average value. Data signal amplitude may be specified in volts. Data signal amplitude may be expressed as a peak or average value. An amplitude of the data signal may be between 0.1 V and 10 V, optionally between 0.5 V and 5 V.

A data transmission rate of the data signal and/or driving signal and/or modulateable light source may be at least 1 kbps, optionally at least 1 Mbps, further optionally at least 1 Gbps.

The signal providing apparatus may be configured to receive input data and to generate the data signal based on the input data.

The signal providing apparatus may be configured to receive an initial data signal from a data source and to generate the data signal based on the initial data signal.

A data transmission rate of the input data may be at least 1 kbps, optionally at least 1 Mbps, further optionally at least 1 Gbps.

The signal providing apparatus may be configured to connect to a Local Area Network (LAN) via an Ethernet connection. The input data may comprise Ethernet data.

The signal providing apparatus may comprise an optical wireless transmitter or optical wireless transceiver. The signal providing apparatus may comprise an access point.

The input data may be modulated using at least one of phase-shift keying, pulse-amplitude modulation The data signal and/or driving signal may be modulated using at least one of on-off keying, quadrature amplitude modulation, phase shift keying, orthogonal frequency division multiplex, amplitude modulation, frequency modulation. The data signal and/or driving signal may be analog. The data signal and/or driving signal may be digital.

The signal providing apparatus may be configured to alter a modulation scheme such that the initial data signal is provided according to a first modulation scheme and the data signal is modulated according to second modulation scheme.

The signal providing apparatus may comprise at least one of a LiFi transmitter, a LiFi access point.

The signal providing apparatus may further comprise a receiver configured to receive modulated light.

The receiver may comprise an optical wireless receiver. The receiver may comprise a LiFi receiver.

The modulateable light source may comprise at least one light-emitting diode (LED).

The modulateable light source may comprise at least one of an LED, a laser, a laser diode, a light emitting plasma (LEP).

The system may further comprise a wired feedback apparatus configured to collect diagnostic data from the driver apparatus and/or luminaire and/or one or more sensors associated with the driver apparatus and/or luminaire. The wired feedback apparatus may provide a wired feedback signal representative of said diagnostic data to the signal providing apparatus using the signal cable.

The wired feedback apparatus may comprise one or more sensors associated with the driver apparatus and/or luminaire. The sensors may be provided as part of the driver apparatus and/or luminaire.

The diagnostic data may comprise data representative of one or more physical property(ies) indicative of operating environment or condition of at least one component of the driver apparatus and/or luminaire, for example, driver apparatus temperature or other operating parameter or modulateable light source health and/or modulateable light source operating parameter(s). The diagnostic data may comprise temperature data.

The system may further comprise one or more other luminaires comprising one or more other modulateable light sources, wherein the one or more other modulateable light sources are configured to be driven by the driving signal, the one or more other modulateable light sources thereby producing modulated light. Said other modulateable light sources and said other luminaires may also for example be referred to as secondary light sources and secondary luminaires.

Said at least one of the other luminaries may comprise at least one further receiver configured to receive modulated light.

The system may further comprise a further driver apparatus and one or more further luminaires comprising one or more further modulateable light sources. The further driver apparatus may be configured to receive a further data signal from the signal providing apparatus and produce a further driving signal to drive the one or more further modulateable light sources of the one or more further luminaries, the one or more further modulateable light sources thereby producing modulated light.

The further driver apparatus may be positioned within a housing of the signal providing apparatus.

In a second aspect of the invention, which may be provided independently, there is provided a system comprising: a driver apparatus comprising a terminal for connecting to a signal cable, wherein the driver apparatus is configured to receive via the signal cable when connected to the terminal a data signal from a signal providing apparatus separate from the driving apparatus and to process the data signal to produce a driving signal; and a luminaire comprising a modulateable light source, wherein the modulateable light source is configured to be driven by the driving signal, thereby to produce modulated light; wherein the driver apparatus is positioned adjacent to or within the luminaire. The processing of the data signal may comprise amplifying the data signal.

In a third aspect of the invention, which may be provided independently, there is provided an optical wireless communication system comprising: a signal providing apparatus configured to generate a data signal; and a plurality of driver apparatuses and a corresponding plurality of luminaires, wherein each of the plurality of driver apparatuses is positioned adjacent to or within a corresponding one of the plurality of luminaires; wherein each of the plurality of driver apparatuses is separate from the signal providing apparatus and coupled to the signal providing apparatus by at least one signal cable; and wherein each of the plurality of driver apparatuses is configured to receive the data signal via its respective signal cable and to process the data signal to produce a driving signal to drive a modulateable light source of the corresponding one of the plurality of luminaires, the modulateable light source thereby producing modulated light. The processing of the data signal may comprise amplifying the data signal.

The plurality of driver apparatuses may be connected in series. Alternatively, the plurality of driver apparatuses may be connected in parallel. The at least one signal cable may comprise a single signal cable connecting each of the driver apparatuses. The driver apparatuses may be connected by the at least one signal cable in a daisy chain arrangement.

A plurality of luminaires may be driven from a single LiFi unit. Driving a plurality of luminaires from a single LiFi unit may allow the same data to be transmitted from a plurality of luminaires. Large areas may be supplied with the same information.

The optical wireless communication system may be a low-speed unidirectional LiFi system.

The plurality of luminaires may comprise at least a first type of luminaire and a second type of luminaire, and the plurality of driver apparatuses may comprise at least one driver apparatus of a first type compatible with the first type of luminaire and at least one driver apparatus of a second type compatible with the second type of luminaire.

The first driver apparatus may be specific to and/or optimised for the first type of luminaire. The second driver apparatus may be specific to and/or optimised for the second type of luminaire.

By offering different driver apparatuses that are compatible with the same LiFi units, it may be possible to support many different types of luminaires which might not be possible if using a single driver apparatus design. Each driver apparatus may be purpose-designed for the characteristics of an LED technology with which it is used.

Each of the plurality of luminaires may comprise a respective receiver configured to receive modulated light.

The receiver may comprise electronic circuitry and optics. Integrating the receiver into the luminaire may increase the coverage area for the return link.

At least one of the plurality of luminaires may comprise at least one receiver configured to receive modulated light.

At least one of the plurality of driver apparatuses and at least one of the plurality of luminaires may be provided in a single housing.

In a fourth aspect of the invention, which may be provided independently, there is provided a method of providing optical wireless communication, comprising receiving via a signal cable a data signal at a driver apparatus adjacent to or within a luminaire, processing the received data signal and providing the amplified signal to a light source of the luminaire to drive operation of the light source thereby to output modulated light that has a modulation representative of at least some data represented by the data signal. The processing of the received data signal may comprise amplifying the received data signal. The processing of the signal may comprise applying a gain to the received data signal, for example a gain less than, equal to, or greater than 1.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

BRIEF DESCRIPTION OF THE DRAWINGS

Embodiments of the invention are now described, by way of non-limiting examples, and are illustrated in the following figures, in which:

FIG. 2 is a schematic illustration of a system 30 in accordance with an embodiment. The system of FIG. 2 is a LiFi system in which data is transmitted using visible light communication (VLC). In other embodiments, the system may be any optical wireless communication system, which may or may not use visible light for data transmission. For example, the optical wireless communication system may transmit data using infrared or ultraviolet light.

Figure 1:
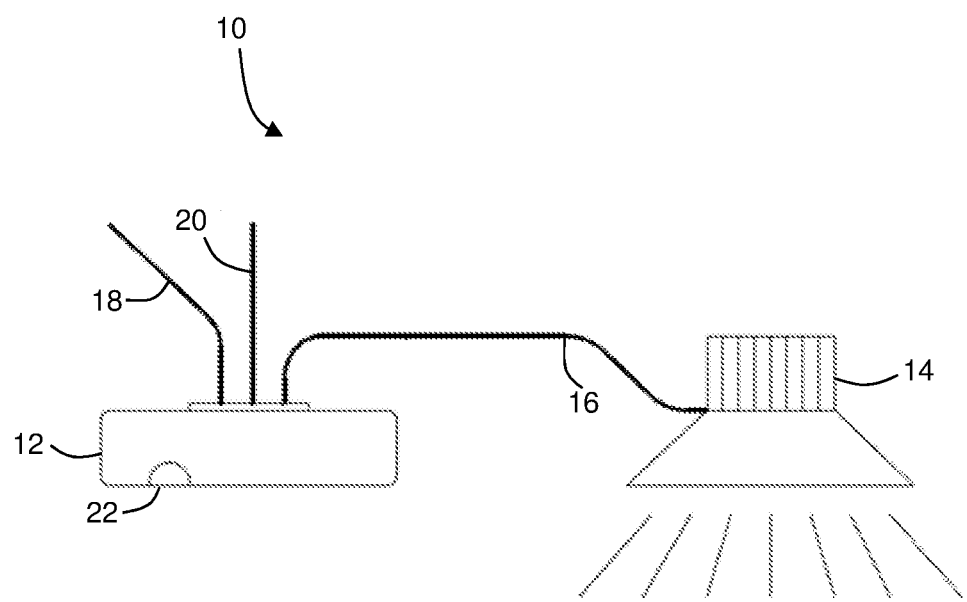
FIG. 1 is a schematic illustration of an existing LiFi setup.

The LiFi system 30 comprises a LiFi unit 32, luminaire 34 and stand-alone LED driver 50.

The LiFi unit 32 is configured to generate a data signal. The LiFi unit 32 comprises a transmitter (not shown) which is configured to transmit the data signal. The LiFi unit 32 is connected to the stand-alone LED driver apparatus 50 by a wire 36 over which the data signal is transmitted. The length of the wire is such that the LiFi unit 32 may be considered to be remote from the stand-alone LED driver 50. For example, the length of the wire may be 20 cm, 30 cm, 50 cm or 1 metre or more.

In the present embodiment, the wire 36 is a low-power, high-speed signal cable. The wire 36 is configured to transmit signals at a peak current level of between 1 mA and 100 mA. In the present embodiment an amplitude of the data signal is 1V_pp. The wire 36 has a specified impedance which matches an impedance of the transmitter in the LiFi unit 32 and of a receiver (not shown in FIG. 2) in the stand-alone LED driver apparatus 50. In the present embodiment, the impedance of the transmitter in the LiFi unit 32 and of the receiver in the stand-alone LED driver apparatus 50 is 50 Ω. A data signal amplitude of 1V_pp, matched to 50 Ω, results in a current of 20 mA_pp due to the 50 Ω input impedance of the driver apparatus 50.

The LiFi unit 32 is also connected to a LAN cable 38 and power cable 40. The LiFi unit 32 further comprises a receiver 42. In the present embodiment, receiver 42 is an optical receiver configured to receive modulated light. The LiFi unit 32 therefore acts as an Access Point (AP) which is configured both to transmit data and to receive data.

In other embodiments, the LiFi unit 32 may be replaced or supplemented by any suitable signal providing apparatus, for example any suitable signal generation apparatus configured to generate a data signal. The signal generation unit may be unidirectional (transmit only), in which case the receiver 42 may be omitted. The signal generation unit may be bi-directional (transmit and receive).

The stand-alone LED driver apparatus 50 is connected to the luminaire 34 by a short wire 52. The length of the short wire 52 is such that the stand-alone LED driver apparatus 50 may be considered to be adjacent to the luminaire 34. For example, a length of the short wire 52 may be 2 cm. In other embodiments, the length may be less than 5 cm. In some embodiments, a direct connection may be made between the luminaire 34 and stand-alone LED driver apparatus 50 may be made. The luminaire 34 and stand-alone LED driver apparatus 50 may be connected without the use of a short wire 52. For example, mating connectors on the luminaire 34 and stand-alone LED driver apparatus 50 may be used.

The stand-alone LED driver apparatus 50 is also connected to a power cable 54.

The stand-alone LED driver apparatus 50 comprises a data input terminal 60, control interface 62, digital to analog converter 64, adjustable gain/attenuation component 66, voltage to current amplifier 68, and LED output terminal 70, which are described further below with reference to FIG. 3. The voltage to current amplifier 68 comprises an op-amp and MOSFET and sense resistor.

In the present embodiment, the luminaire comprises at least one LED. For simplicity, the driving of a single LED is discussed below. However, in practice, the luminaire 34 may comprise a plurality of LEDs, some or all of which are driven by the stand-alone LED driver apparatus 50. Any type of LED may be used, for example at least one OLED (organic light emitting diode). Although the light source of the present embodiment is an LED, in other embodiments any suitable modulateable light source may be used. For example, the light source may comprise a laser, laser diode, or light-emitting plasma (LEP).

In the present embodiment, the luminaire has a power of 25 W. In other embodiments, the luminaire may have any appropriate power, for example a power between 1 W and 50 W. Luminaires having a power between 1 W and 50 W may be used for some general lighting applications. For example, a low-power retrofit LED bulb may have power of between 2 and 3 W. Luminaires having a power of more than 10 W may be found in high-brightness areas, for example in offices.

In use, the LiFi unit 32 receives input data from the LAN cable 38. In the present embodiment, the LAN cable is an Ethernet cable, and the input data received is Ethernet data. In other embodiments, any suitable input data may be received. The LiFi unit 32 receives power via the power cable 40.

Input data received by the LiFi unit 32 from the LAN cable 38 may be modulated using whatever the network protocol used to connect to the LiFi unit 32 is using. In one embodiment, the input data comprises Ethernet data modulated using PAM. The LiFi unit 32 may act as a network bridge, or router. It may contain buffers for incoming data (on both LiFi uplink, if available, and the network connection) and translates between the protocols used on LiFi and network. It may also handle multiple access (several stations using the same AP, multiplexed in time and/or modulation frequency of the light) and it may provide infrastructure for seamless roaming of a station between multiple stations (i.e. communication between LiFi STA and a device on the network/internet isn't interrupted when a STA moves from one AP to another, assuming the light cones of the associated luminaires overlap).

The LiFi unit 32 may have all of the network protocol processing layers in it (e.g. TCP, IP, Ethernet) as well as the corresponding layers for the LiFi protocol (MAC, PHY). The LiFi unit 32 may comprise functions comprising: encapsulating/re-framing data in a format suitable for a LiFi protocol; error detection and correction; data re-transmission if necessary; data encryption/decryption; management of stations; and/or Power over Ethernet (PoE) power negotiation.

The LiFi unit 32 processes the input data and outputs a data signal based on the input data using its transmitter. In the present embodiment, the data signal is a digital signal. In other embodiments, the data signal may be an analog signal.

In some embodiments, the input data is provided to the LiFi unit 32 as an initial data signal from a data source and the LiFi unit 32 generates the data signal based on the initial data signal.

In some embodiments, the data signal comprises the same or similar information content to the input data, but is differently modulated. For example, the LiFi unit may receive input data that is modulated using phase-shift keying and output a data signal that is modulated using on-off keying. In some embodiments, the LiFi unit is configured to alter a modulation scheme such that the initial data signal is provided according to a first modulation scheme and the data signal is modulated according to second modulation scheme.

The signal sent from the LiFi unit 32 to the stand-alone LED driver apparatus 50 may comprise a simple representation of the desired LED brightness in real time, either digital (serial or parallel) or analog.

The stand-alone LED driver apparatus 50 receives the data signal from the LiFi unit 32 via the wire 36. The stand-alone LED driver apparatus 50 is connected to the LiFi unit 32 through a low-power, high-speed signal cable (wire 36), which may minimise signal losses. When using a cable (wire 36) with a specified impedance and matching the impedance of the transmitter in the LiFi unit and the receiver in the stand-alone LED driver, signal degradation due to the wire 36 may be minimal even in long runs of cable.

The stand-alone LED driver apparatus 50 does a simple translation of the data signal into an LED current required to get a brightness linear with a value of the data signal (e.g. voltage for analog signals, or numerical value for digital signals). The LED current output by the LED driver apparatus 50 may be referred to as a driving signal.

Figure 3:
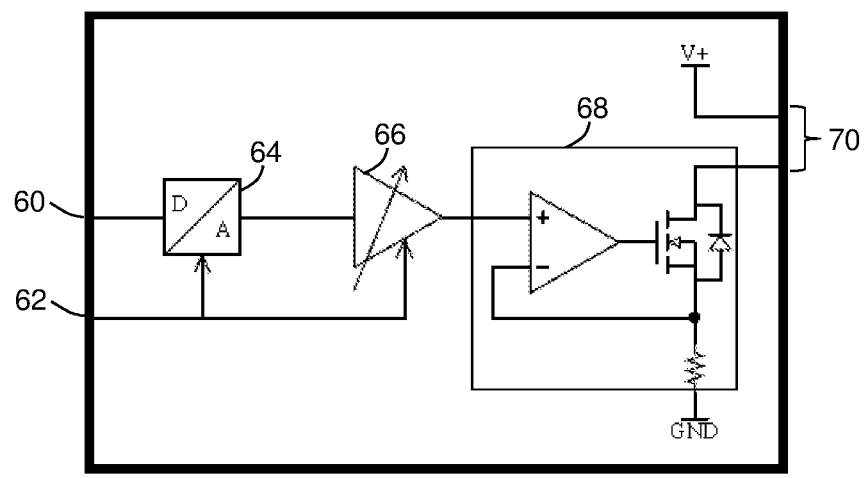
FIG. 3 is a schematic diagram of a stand-alone LED driver.

FIG. 3 is a schematic diagram of components of the LED driver apparatus 50. In use, the stand-alone LED driver apparatus receives the data signal from wire 36 via data input terminal 60. In some embodiments, data input terminal 60 is a data input connector 60. In other embodiments, the wire 36 may be permanently attached to data input terminal 60. The stand-alone LED driver apparatus 50 may also receive control signals via the control interface 62.

The control interface 62 may connect to the LiFi unit 32 to receive commands (and, in some embodiments, to send back status information about the stand-alone driver apparatus 60 and/or luminaire 34). The control interface may connect with the LiFi unit 32 using, for example, protocols such as I2C (Inter-Integrated Circuit), RS485, or CAN (Controller Area Network).

In some embodiments, the control interface 62 connects directly to light control infrastructure. The light control infrastructure may comprise, for example DALI (Digital Addressable Lighting Interface) infrastructure, 0-10V lighting control infrastructure, or DSI (Digital Signal Interface) infrastructure. In some embodiments, the control interface 62 is omitted.

In the present embodiment, the data transferred between the LiFi unit 32 and the stand-alone LED driver apparatus 50 is digital. The driver contains circuitry (the digital to analog converter 64) for converting the digital signal to an analog signal. In some other embodiments, the data transferred between the LiFi unit 32 and the stand-alone LED driver apparatus 50 is analog, and the DAC 64 may be omitted from the stand-alone LED driver apparatus 50.

The analog signal generated by the DAC 64 is passed to an adjustable gain/attenuation component 66. The adjustable gain/attenuation component 66 may be used, for example, to perform dimming. In some embodiments, the adjustable gain/attenuation component 66 is omitted.

The digital to analog converter 64 and/or adjustable gain/attenuation component 66 may be controlled based on one or more control signals provided via the control interface 62. For example, the control signals may control dimming using the adjustable gain/attenuation component 66.

After passing through the adjustable gain/attenuation component 66, the analog signal is amplified by the voltage-to-current amplifier 68 to provide a driving signal. A gain is greater than unity. In other embodiments, the analog signal may be processed to produce a driving signal using a gain of unity, or of less than unity.

The driving signal may have a higher voltage to the voltage of the data signal, and much higher current. For example, in the present embodiment, a current of the data signal is of the order of mA while a current of the driving signal is 1 A or more.

In the present embodiment, the voltage used to drive the luminaire 34 may be 30 to 40 V. In other embodiments, a voltage using to drive the luminaire 34 may be between, for example, 1 V and 200 V. For example, a voltage for a single white LED may be 3V while a very long string of LEDs may have a voltage of over 100 V. In some circumstances, an upper limit may be, for example 60 V or 100 V. The upper limit may be due to safety regulations and/or due to the availability and/or size of high-voltage components.

The data signal may be of lower voltage. For analog transmission, a peak to peak voltage may be, for example, 1 V_pp. The transmitter may operate on typical logic level voltages such as 5 V or 3.3 V. A slew rate requirement for the transmitter may be reduced.

In some embodiments, higher voltages (for example, 5V_pp or 10V_pp) may be used for very long and/or noise sensitive runs of cable. For digital, the voltage used may be 5 V. 3.3 V, 2.5 V or 1.8 V, or differential (for example, Low Voltage Differential Signalling) with a lower differential amplitude, for example 0.5 V. Voltages may be similar to those used for signalling in other high-speed transmissions, for example USB 2.0 or HDMI.

The driving signal is output via LED output terminal 70. On the output side of the stand-alone LED driving apparatus, a very short wire 52 is used to connect the LED output terminal 70 to one or more LEDs of the luminaire 54. In the present embodiment, a length of the short wire is 2 cm. In other embodiments, the short wire may be, for example, less than 5 cm, less than 3 cm, or less than 1 cm long.

The driving signal drives one or more LEDs (not shown) of the luminaire 34. The driving signal comprises a varying current which modulates the LED brightness to transmit data at a high data rate. In the present embodiment, an average LED current is 500 mA, with 200 mA and 1 A being the extremes during modulation. LED brightness is approximately linear with current. The LEDs are not turned off completely. In other embodiments, the light source or sources may be turned down or turned off completely during modulation. The LED or LEDs are modulated at a rate such that the modulating of the LED or LEDs is invisible to the human eye.

In the present embodiment, a data rate of transmission by the LEDs is of the order of Mbps. In other embodiments, a data rate of transmission may be of the order of Gbps.

The transmitted data may be received by a receiver (not shown) comprising a photosensor and circuitry configured to decode the transmitted data.

Figure 2:
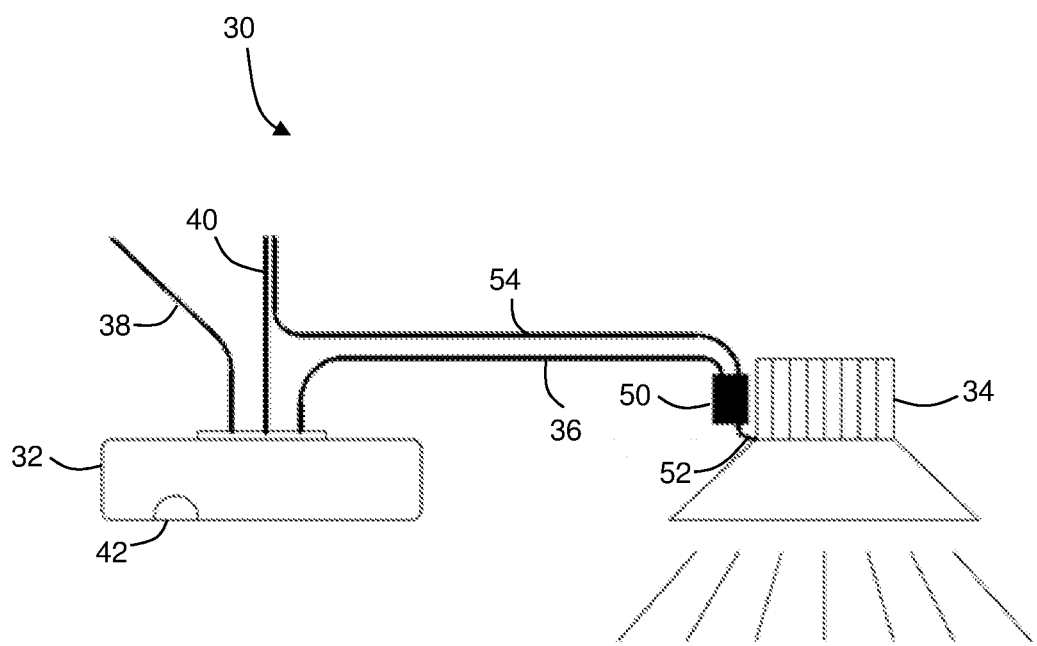
FIG. 2 is a schematic illustration of a LiFi system of an embodiment in which the LiFi system uses a stand-alone LED driver.

For example, in one embodiment the system of FIG. 2 is mounted on the ceiling of an office and the luminaire is an overhead lamp. The overhead lamp is driven to stream high-speed data. The light from the overhead lamp is received by a receiver embedded in a receiver dongle. The receiver converts the transmitted light back into a data signal which is then provided to a computer apparatus, for example a PC. The use of modulated light may allow secure wireless transmission of high speed data. The data transmission may be restricted to a single room, since light cannot pass through walls.

In the present embodiment, the LiFi system 30 also supports an illumination only mode in which the stand-alone driver apparatus 50 is supplied with a constant, unmodulated signal determining the brightness of the luminaire 34 (i.e., dimming). This can be by means of a constant signal level over an analogue connection or a command over a digital connection.

By using a driving apparatus that is placed adjacent to the luminaire, losses in transmitting the driving signal may be reduced. The power requirement for the driver apparatus may be reduced. In some circumstances, signal degradation may be minimal. A signal transmitted from the LiFi unit 32 may travel mostly over a high-speed low-power cable, with only a small fraction of the distance from the LiFi unit 32 to the luminaire being traversed by the higher-power driving signal. Power consumption and/or losses therefore may be reduced.

Noise may be reduced. Electromagnetic interference may be reduced. Other radiation may also be reduced. For example, in some circumstances EM radiation may be emitted from the wire that is capable of being decoded to reconstruct the data being sent, which may cause a security issue. In some circumstances, LiFi may be used for data transmission because it is secure. The modulated light used in LiFi does not pass through walls, and therefore a LiFi signal may be contained within a target area. If EM radiation is emitted, that EM radiation may be able to pass through walls and out of the target area. By using a stand-alone driver apparatus, a lower-power signal may be sent from the LiFi unit to the driver apparatus, which may reduce EM radiation that may compromise security.

A signal bandwidth of the system may be improved when compared with a system in which a driving signal is provided by the LiFi unit and transmitted over a substantial length of cable (for example 20 to 30 cm).

In the embodiment described above with reference to FIGS. 2 and 3, the data signal is digital. By transmitting a digital data signal rather than an analog data signal, the signal cable may be less sensitive to external electromagnetic interference (EMI).

However, in other embodiments, the data signal transmitted by the LiFi unit 32 over the wire 36 is analog. If the data signal is analog, the stand-alone LED driving apparatus 50 may not comprise digital-to-analog conversion circuitry. The omission of a digital-to-analog converter may make the stand-alone LED driving apparatus 50 simpler and/or more cost-efficient. However, in some circumstances, when analog data is used for the data signal the signal cable may be more sensitive to external EMI than if digital data were used for the data signal.

In some embodiments, shielding may be used to reduce emissions from the signal cable 36 and/or susceptibility to electromagnetic interference (EMI).

In a further embodiment, the wire 36 comprises a fibre optic cable. The data signal comprises an optical signal. The use of a fibre optic cable for the connection may reduce or remove sensitivity to EMI. The use of a fibre optic cable may prevent radiation from being emitted by the data connection between the LiFi unit 34 and the stand-alone LED driver apparatus 50. Preventing emission of radiation may improve security.

In the embodiment described above with reference to FIGS. 2 and 3, a DC power supply is used to supply the stand-alone LED driver apparatus 50 with power to supply the luminaire. The DC power is supplied to the stand-alone LED driver apparatus 50 via power cable 54.

Figure 4:
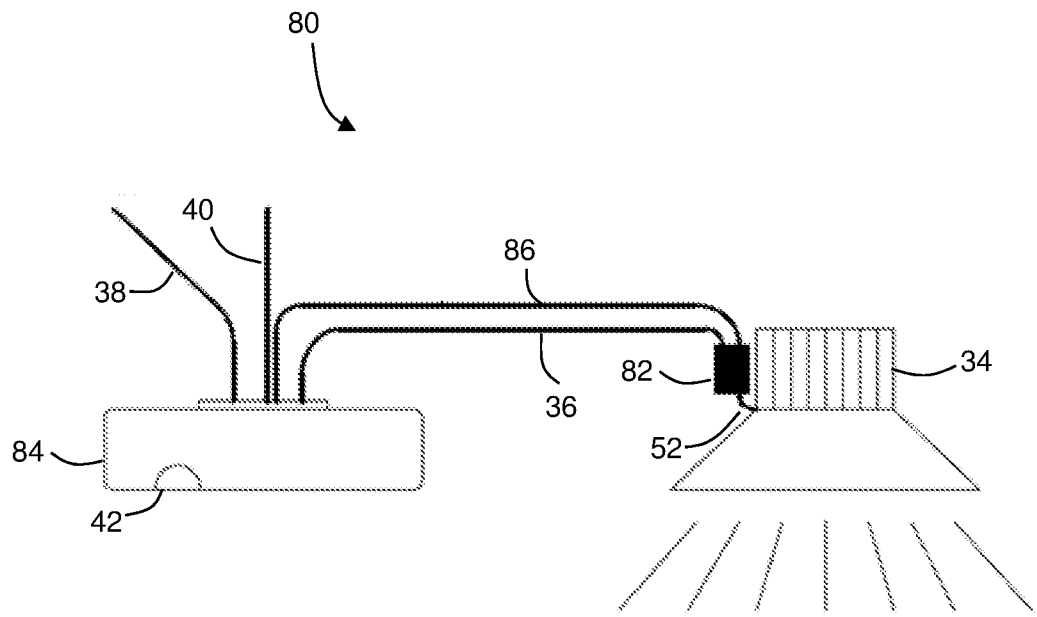
FIG. 4 is a schematic illustration of a LiFi system of an embodiment in which the LED driver is powered from the LiFi unit.
Figure 5:
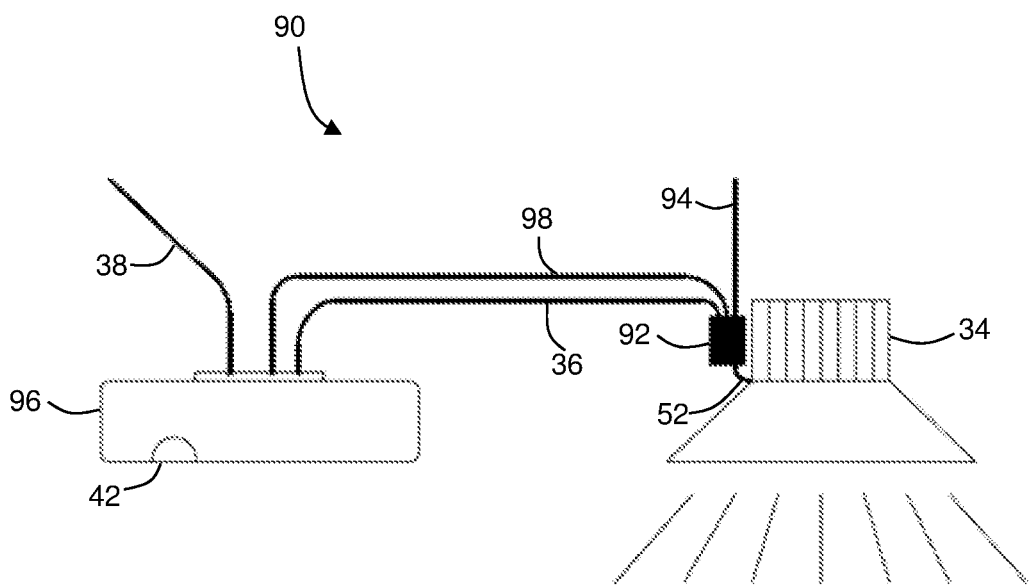
FIG. 5 is a schematic illustration of a LiFi system of an embodiment in which the LiFi unit is powered from the LED driver.

In other embodiments, the power supply may be part of the LiFi unit 32 or be an additional component of the system. FIG. 4 and FIG. 5 show two possible methods of power distribution. In other embodiments, any suitable method of power distribution may be used.

FIG. 4 shows an embodiment of a LiFi system 80 in which power is supplied to a stand-alone LED driver apparatus 82 from the LiFi unit 84 by power cable 86. The LED driver apparatus 82 is therefore powered from the LiFi unit 84. The LiFi unit 84 is powered by PoE (power over ethernet). Therefore, power is only available at the connection point of the ethernet cable. A single harness may be used between the stand-alone LED driver apparatus 82 and stand-alone driver apparatus 84, the single harness comprising data, power, and an optional control cable.

FIG. 5 shows an embodiment of a LiFi system 90 in which power is supplied to a stand-alone LED driver apparatus 92 by a power cable 94. The stand-alone LED driver apparatus 92 then provides power to the LiFi unit 96 via a further power cable 98. In the embodiment of FIG. 5, the LiFi unit 96 is powered from the LED driver apparatus 92. In some circumstances, the driver may be the main consumer of power. In the embodiment of FIG. 5, external power is connected to the driver. Powering the LiFi unit 92 from the stand-alone LED driver apparatus 92 may remove the need for additional cabling. For example, data, power, and an optional control cable between the LiFi unit 96 and the stand-alone driver apparatus 92 may be integrated into a single, custom harness with a single plus on each end, facilitating installation.

Other components of the embodiments of FIG. 4 and FIG. 5 (for example luminaire 34, signal cable 36, LAN cable 38, power cable 40, receiver 42, and short wire 52) are the same as similarly-numbered components described above with reference to FIG. 2. In further embodiments, different components may be used.

In the embodiments described above with reference to FIGS. 2 to 5, a stand-alone LED driver apparatus 50 is positioned adjacent to the luminaire 34. By placing the stand-alone LED driver apparatus 50 adjacent to the luminaire 34, signal degradation may be reduced when compared to a system in which a driving signal is transmitted along a longer length of wire (for example, 20 cm to 30 cm). The driver apparatus 50 may be placed as close as possible to the luminaire 34 to avoid signal degradation.

In further embodiments, the LED driver apparatus is positioned within the luminaire, for example within a housing of the luminaire. Such positioning may further reduce signal degradation.

In some such embodiments, the LED driver apparatus is integrated in the luminaire on the same PCB as the LED or LEDs of the luminaire, thus requiring no wire to connect the LED driver apparatus and LED or LEDs.

It has been shown that in some embodiments, by integrating the driver components on the same PCB as the LEDs, the power loss in the driver apparatus may be reduced by more than 50% compared to a lamp connected through a 30 cm long cable. The reduction in power loss may be without sacrificing performance.

In some embodiments, the LED or LEDs and the driver apparatus are integrated on a single chip or hybrid circuit, or use separate chips in a single package. In some embodiments in which the LED or LEDs and driver apparatus are integrated into an IC (integrated circuit) or single package or on the same PCB, the driver apparatus is purpose-designed for the characteristics of the particular type of LED technology used.

Purpose-designing the driver apparatus may improve (for example, maximise) performance.

Figure 6:
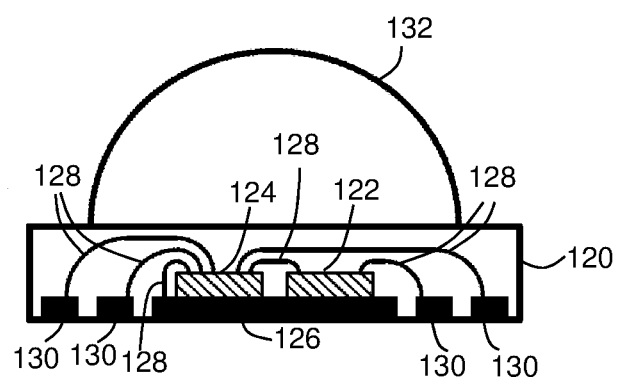
FIG. 6 is a schematic illustration of separate LED and driver chips integrated into a single LED package, in accordance with an embodiment.

FIG. 6 is a schematic illustration of a LED package comprising separate LED and driver chips. An LED package 120 contains an LED chip 122 comprising one or more LEDs and a driver chip 124 comprising an LED driving apparatus. The LED chip 122 and driver chip 124 are positioned on a thermal pad 126 for heat removal. Bond wires 128 connect the LED chip 122 to signal and/or power pads 130; connect the driver chip to signal and/or power pads 130; and connect the LED chip 122 to the driver chip 124.

The LED package 100 comprises a lens 132 which may comprise a phosphor coating for changing a colour of the light emitted by the LED or LEDs.

In use, the driver chip 124 drives the LED to produce modulated light. The lens 110 may cause the light emitted by the LED to form a beam of a desired shape. A colour of the modulated light may be changed by the phosphor coating.

Figure 7:
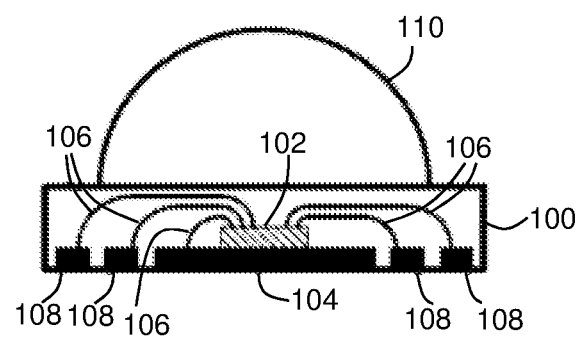
FIG. 7 is a schematic illustration of a single-chip driver and LED in accordance with an embodiment.

FIG. 7 is a schematic illustration of a single-chip driver and LED. An LED package 100 contains a combined LED and driver chip 102. At least one LED and an LED driving apparatus are integrated onto the single combined chip 102. The chip 102 is positioned on a thermal pad 104 for heat removal. Bond wires 106 connect the single combined chip 102 to signal and/or power pads 108. The LED package 100 comprises a lens 110 which may comprise a phosphor coating for changing a colour of the light emitted by the LED or LEDs.

In use, the driver drives the LED to produce modulated light. The lens 110 may cause the light emitted by the LED to form a beam of a desired shape. A colour of the modulated light may be changed by the phosphor coating.

In some embodiments in which the driver and LED are integrated into the same package, the driver PCB or IC may also contain a receiver photodetector and/or circuitry. The receiver photodetector may be configured to receive modulated light from a further modulated light source, for example from a dongle attached to a PC. In other embodiments, a receiver may be integrated into the luminaire and/or driver apparatus in any suitable manner. The receiver may comprise a photosensor (for example, a camera) configured to receive modulated light and a processor configured to process the modulated light to obtain data.

In the case of the driver and LED being integrated into the same package, the driver PCB or IC may also contain the receiver photodetector and/or circuitry, or the receiver may be realised using a separate IC.

In some embodiments, the luminaire and/or driver apparatus comprises an optical feedback apparatus. In an embodiment, the optical feedback apparatus is configured to provide feedback regarding an LED of the luminaire and/or an LED that is driven by the driver apparatus (i.e. a local rather than a remote LED). The optical feedback apparatus may be configured to linearise the LED, for example to compensate for a change in the performance of the LED with heating.

In one embodiment, the optical feedback apparatus comprises a photosensor configured to receive modulated light from the LED. The photosensor may be placed very close to the LED, for example, within 1 cm of the LED. The photosensor may be within the same housing as the LED.

The photosensor generates a signal which is fed into the driver apparatus. The signal may comprise an analog feedback signal. The driver apparatus adjusts the modulated light (for example, an intensity of the modulated light) in dependence on the analog feedback signal. The optical feedback apparatus comprises a real-time feedback loop.

In some embodiments, the optical feedback apparatus, LED and driver apparatus are all positioned within the same package.

Figure 9:
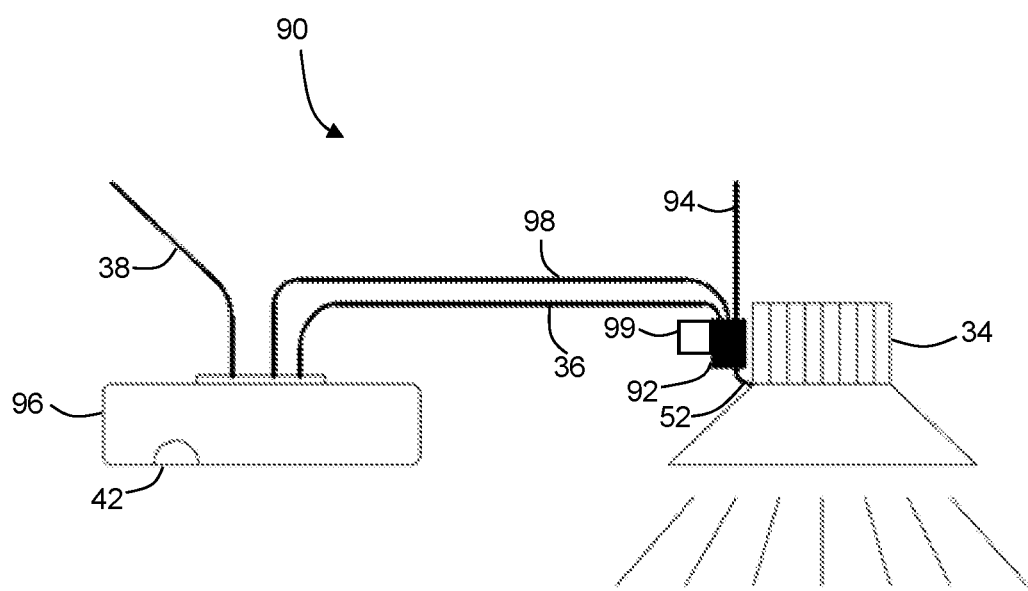
FIG. 9 is in some embodiments, the system comprises a feedback apparatus, for example a wired feedback apparatus 99, configured to collect diagnostic data from the driver apparatus and/or luminaire and/or one or more sensors associated with the driver apparatus and/or luminaire.

In some embodiments, the system comprises a feedback apparatus, for example a wired feedback apparatus 99, configured to collect diagnostic data from the driver apparatus and/or luminaire and/or one or more sensors associated with the driver apparatus and/or luminaire. The wired feedback apparatus 99 provides feedback, for example, a feedback signal that is representative of said diagnostic data, to the LiFi unit 32. In some embodiments, feedback signal is provided to the LiFi unit 32 using the wire 36. In other embodiments, a further signal cable is provided between the luminaire and/or driver apparatus and LiFi unit 32 for carrying the wired feedback signal. FIG. 9 illustrates a system in which a wired feedback apparatus 99 is present. Other features of FIG. 9 correspond to those of FIG. 5 as described above.

One or more sensors for collecting diagnostic data may be provided. In some embodiments, these may part of the driver apparatus and/or luminaire. The sensors may be temperature sensors.

The diagnostic data may comprise data representative of one or more physical properties indicative of operating environment or component condition of the driver apparatus and/or luminaire, for example, driver apparatus temperature or modulateable light source health. The diagnostic data may comprise temperature data.

In some embodiments, the LED is dimmable. In some embodiments, dimming information is encoded in the data signal. In some embodiments, dimming functionality is provided by the driver apparatus, for example using adjustable gain/attenuation component 66. By moving driving to the driver apparatus 50 rather than the LiFi unit 32, a signal transmitted over the wire 36 may have constant power. In contrast, if a driving signal is provided over a wire after having already been dimmed, its power may vary in accordance with the dimming level. A constant power signal may allow consistent performance to be achieved regardless of dimming level.

In the embodiments described above with reference to FIGS. 2 to 7, a LiFi unit (for example, LiFi unit 32 of FIG. 2) is connected to a single driving apparatus (for example, stand-alone driver apparatus 50) placed adjacent to or within a single luminaire (for example, luminaire 34).

Figure 8:
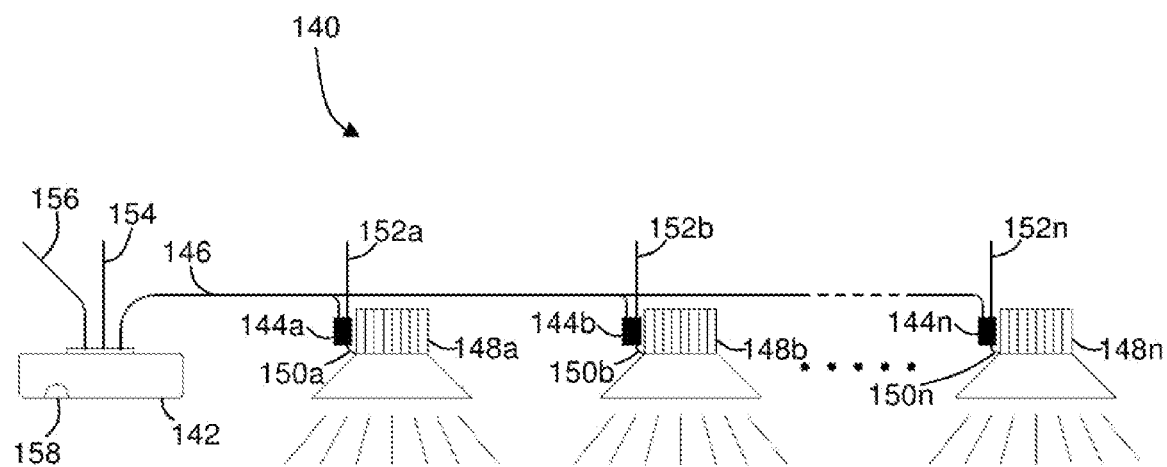
FIG. 8 is a schematic illustration of a LiFi system of an embodiment in which several luminaires are controlled by a single LiFi unit.

In further embodiments, several luminaires are driven from the same LiFi unit. FIG. 8 is a schematic illustration of a LiFi system 140 in which a single LiFi unit 142 supplies a data signal to a plurality of stand-alone LED driver apparatuses 144a, 144b, . . . 144n via a signal cable 146. Each of the stand-alone LED driver apparatuses 144a, 144b, . . . 144n is connected to respective one of a matching plurality of luminaires 148a, 148b, . . . 148n by a respective short wire 150a, 150b, 150n. Power is supplied to the luminaires 148a, 148b, . . . 148n by power cables 152a, 152b, . . . 152n. Power is supplied to the LiFi unit 142 by power cable 154. The LiFi unit 142 receives an Ethernet signal through LAN cable 156. In the present embodiment, the LiFi unit 142 comprises a receiver 158. In other embodiments, the receiver 158 may be omitted.

Although only three luminaires and three driving apparatuses are shown in FIG. 8, in other embodiments any number of luminaires and corresponding number of driving apparatuses may be used. FIG. 8 shows stand-alone driver apparatuses 144a, 144b, . . . 144n, but in further embodiments each driver apparatus 144a, 144b, . . . 144n may be integrated into a respective luminaire 148a, 148b, . . . 148n.

By using a single LiFi unit 142 to supply a data signal to a plurality of luminaires 148a, 148b, . . . 148n, a larger area may be supplied with the information in the data signal than would be supplied by a single luminaire. In some circumstances, handover issues may be reduced by providing the same signal through multiple luminaires.

By providing each LED driver apparatus 144a, 144b, . . . 144n adjacent to a respective luminaire 148a, 148b, . . . 148n, the higher-power driving signal that drives each luminaire 148a, 148b, . . . 148n is generated very close to that luminaire 148a, 148b, . . . 148n, which may reduce losses and improve performance. The reduction of losses over the wire 146 may be particularly relevant when there is a large distance between the LiFi unit 142 and luminaire 148a, 148b, . . . 148n. A system as shown in FIG. 8 may allow a data signal to be distributed over a large area without significant degradation.

In some circumstances, using a single LED driver to supply a data signal to multiple luminaires may not be feasible due to the high combined power of the luminaires and/or due to the high wiring effort required. By using a single driver for each luminaire, each driver may be low cost due to the limited power required. Wiring requirements may be reduced to mains voltage (which may already be available at the luminaire locations) plus a thin, low-cost data connection (wire 146).

Providing power locally to the LED driver apparatuses 144a, 144b, . . . 144n and luminaires 148a, 148b, . . . 148n may be power-efficient. In some circumstances, existing power connections that are already in place to drive the luminaires 148a, 148b, . . . 148n may be used to drive the LED driver apparatuses 144a, 144b, . . . 144n. For example, the system may be retrofitted to an office or warehouse using existing light fittings.

In the embodiment of FIG. 8, all the luminaires 148a, 148b, . . . 148n are of the same design and all the LED driver apparatuses 144a, 144b, . . . 144n are of the same design. In other embodiments, the luminaires may comprise more than one type of luminaire. Providing stand-alone driver apparatuses (or driver apparatuses that are integrated into the luminaires) may allow a single LiFi unit to supply data to more than one type of luminaire. Different LED drivers may be used which are compatible with the same LiFi unit. It may be possible to support many different types of luminaires. Support for different luminaires may not be possible if a single driver design were to be used. Each driver apparatus may be tailored to its respective luminaire. For example, although each luminaire may be transmitting the same data, different luminaires may be driven using different currents.

In the embodiment of FIG. 8, the LiFi unit 142 comprises a receiver 158 configured to receive modulated light, for example light from a dongle attached to a PC.

In other embodiments, each of the luminaires and/or driver apparatuses may comprise a respective receiver configured to receive modulated light. Each receiver may comprise electronic circuitry and optics. Each receiver may amplify and condition a received modulated light signal. The amplified and conditioned received signals may then be combined and input to the LiFi unit. By integrating the receiver into the driver and/or luminaire, a coverage area for a return link may be increased.

In some embodiment, at least one of the luminaires and/or driver apparatuses may comprise a receiver configured to receive modulated light.

In some embodiments, a set-up in which several luminaires are driven from the same LiFI unit is used in a low-speed unidirectional LiFi system where large areas may be supplied with the same information. For example, unidirectional, low data rate light links may use many luminaires (for example, all the luminaires in a large hall) to transmit the same data simultaneously.

The LiFi system may not comprise any receivers and may be used only for transmission.

FIG. 8 shows one possible configuration for a multi-luminaire LiFi system, in which multiple luminaires 148a, 148b, . . . 148n receive the data signal through a single wire 146. The luminaires 148a, 148b, . . . 148n are spaced along the wire 146. In other embodiments, other methods of distributing the LiFi signal are used. The luminaires 148a, 148b, . . . 148n may be connected to the LiFi unit 142 in any suitable manner, for example by using a star topology or daisy-chaining.

In further embodiments, the multiple luminaires of the multi-luminaire LiFi system are driven by a single driving apparatus. In these embodiments, a single driving apparatus is provided that provides a driving signal to the light sources of the luminaries. In such embodiments, the luminaires are connected to and driven by the single driving apparatus to produce modulated light. The single driving apparatus may be positioned adjacent to or within one of the luminaires of the multi-luminaire system. In some embodiments, at least one of the luminaires of the multi-luminaire LiFi system comprises a receiver configured to receive modulated light.

In further embodiments, a further driver apparatus is provided, together with one or more further luminaires that comprise one or more further modulateable light sources. In such embodiments, a first set of luminaires comprising one or more luminaires is driven by a first driving signal provided from a first driver apparatus and a second set of luminaires are driven by a second driving signal provided from a second driver apparatus. In some embodiments, the first driver apparatus is positioned adjacent to or within one of the first set of luminaires and the second driver apparatus is positioned within a housing of the LiFi unit. The second driver apparatus may form part of the LiFi unit circuitry or be connected to the LiFi unit using a separate connection from the signal cable.

In further embodiments, at least one of a plurality of driver apparatuses and at least one of a plurality of luminaires are provided in a single housing.

Whilst components of the embodiments described herein have been implemented in software, it will be understood that any such components can be implemented in hardware, for example in the form of ASICs or FPGAs, or in a combination of hardware and software. Similarly, some or all of the hardware components of embodiments described herein may be implemented in software or in a suitable combination of software and hardware.

It will be understood that the present invention has been described above purely by way of example, and modifications of detail can be made within the scope of the invention. Each feature disclosed in the description, and (where appropriate) the claims and drawings may be provided independently or in any appropriate combination.

The invention claimed is:

1. An optical wireless communication system comprising:
 a signal providing apparatus configured to receive an initial data signal from a data source and generate, based on the initial data signal, a data signal in accordance with a modulation scheme,
 wherein the initial data signal is provided according to a further, different modulation scheme;
 the signal providing apparatus is further configured to alter the modulation scheme from the further modulation scheme of the initial data signal to the modulation scheme of the data signal,
 wherein the data signal comprises a communication signal in accordance with a selected communication protocol;
 a driver apparatus remote from the signal providing apparatus and coupled to the signal providing apparatus by a signal cable having a length of at least 10 cm;
 a power cable configured to provide power to the driving apparatus, wherein the driver apparatus is configured to receive the data signal via the signal cable and to receive power via the power cable;

the driver apparatus is further configured to process the data signal to produce a driving signal, the driving signal having a higher power than the data signal; and a luminaire comprising a modulateable light source, wherein the modulateable light source is configured to be driven by the driving signal, thereby to produce modulated light, wherein the driver apparatus is positioned adjacent to or within the luminaire.

2. The system according to claim 1, wherein the luminaire further comprises a housing and the driver apparatus is provided within the housing of the luminaire.

3. The system according to claim 1, wherein the driver apparatus is included on a single chip or a printed circuit board (PCB) of the luminaire and the modulateable light source is also included on the single chip or PCB.

4. The system according to claim 1, further comprising a receiver included in at least one of the driver apparatus or the luminaire, wherein the receiver is configured to receive modulated light from a further source remote from the luminaire.

5. The system according to claim 1, wherein the length of the signal cable between the signal providing apparatus and the driver apparatus is optionally at least 20 cm, further optionally at least 50 cm, further optionally at least 1 metre.

6. The system according to claim 1, wherein the signal cable comprises a low-power data connection, for example, the data signal has a peak current at a current level less than 1 mA, optionally between 1 mA and 100 mA, further optionally between 1 mA and 50 mA.

7. The system according to claim 1, wherein the data signal comprises a digital signal and the driver apparatus comprises a digital to analog converter for converting the digital signal to an analog signal.

8. The system according to claim 1, wherein the modulateable light source is dimmable and dimming functionality is provided by the driver apparatus, optionally wherein dimming information is encoded in the data signal.

9. The system according to claim 1, wherein the signal cable comprises electrical cable or fibre optic cable.

10. The system according to claim 1, wherein the signal providing apparatus comprises at least one of a LiFi transmitter or a LiFi access point.

11. The system according to claim 1, wherein the modulateable light source comprises at least one light-emitting diode (LED).

12. The system according to claim 1, further comprising an optical feedback apparatus configured to detect modulated light produced by the modulateable light source and provide a feedback signal to the driver apparatus.

13. The system according to claim 12, wherein at least one of a), b), c) or d):

a) the optical feedback apparatus comprises a photosensor configured to sense light output from the modulateable light source;

b) the optical feedback apparatus is configured to feed a signal representative of the sensed light output into the driver apparatus, optionally wherein the driver apparatus is configured to adjust the driving signal in dependence on the signal representative of the sensed light output;

c) the driver apparatus is configured to control at least one of an amount of amplification or an amplitude of the modulated light in dependence on the feedback signal; or d) the optical feedback apparatus is configured to linearise the modulateable light source, for example to compensate for a change in the performance of the modulateable light source with heating.

14. The system according to claim 1, further comprising:

a wired feedback apparatus configured to collect diagnostic data from at least one of the driver apparatus, the luminaire, or one or more sensors associated with at least one of the driver apparatus or the luminaire, and provide a wired feedback signal representative of the diagnostic data to the signal providing apparatus using the signal cable.

15. The system according to claim 14, wherein the diagnostic data comprises data representative of one or more physical properties indicative of at least one of operating environment or condition of at least one component of at least one of the driver apparatus or the luminaire.

16. The system according to claim 15, wherein the diagnostic data comprises temperature data.

17. The system according to any claim 1, wherein the processing of the data signal comprises amplifying.

18. The system according to claim 1, further comprising one or more other luminaires comprising one or more other modulateable light sources, wherein the one or more other modulateable light sources are configured to be driven by the driving signal, the one or more other modulateable light sources thereby producing modulated light.

19. The system according to claim 18, wherein at least one of the one or more other luminaries comprises at least one further receiver configured to receive modulated light.

20. The system according to claim 1, comprising a further driver apparatus and one or more further luminaires comprising one or more further modulateable light sources, wherein the further driver apparatus is configured to receive a further data signal from the signal providing apparatus and produce a further driving signal to drive the one or more further modulateable light sources of the one or more further luminaries, the one or more further modulateable light sources thereby producing modulated light.

21. The system according to claim 20, wherein the further driver apparatus is positioned within a housing of the signal providing apparatus.

22. A method of providing optical wireless communication using a system according to claim 1, the method comprising receiving via a signal cable a data signal at a driver apparatus adjacent to or within a luminaire, processing the received data signal and providing the processed signal to a light source of the luminaire to drive operation of the light source thereby to output modulated light that has a modulation representative of at least some data represented by the data signal.

23. The method according to claim 22, wherein processing of the data signal comprises amplifying.

24. The system according to claim 1, further comprising a further driver apparatus and one or more further luminaires comprising one or more further modulateable light sources, wherein the further driver apparatus is configured to receive the data signal from the signal providing apparatus and produce a driving signal to drive the one or more further modulateable light sources of the one or more further luminaries, the one or more further modulateable light sources thereby producing modulated light.

25. The system according to claim 1, wherein the power cable is configured to supply power from the signal-providing apparatus to the driver apparatus, optionally wherein a single harness comprises the signal cable and the power cable.

26. An optical wireless communication system comprising:
a signal providing apparatus configured to receive an initial data signal from a data source and generate, based on the initial data signal, a data signal in accordance with a modulation scheme, wherein the initial data signal is provided according to a further, different modulation scheme, and the signal providing apparatus is configured to alter the modulation scheme from the further modulation scheme of the initial data signal to the modulation scheme of the data signal,
wherein the data signal comprises a communication signal in accordance with a selected communication protocol;
a plurality of driver apparatuses and corresponding plurality of luminaires, wherein each of the plurality of driver apparatuses is positioned adjacent to or within a corresponding one of the plurality of luminaires;
wherein each of the plurality of driver apparatuses is remote from the signal providing apparatus and is coupled to the signal providing by at least one signal cable having a a length of at least 10 cm; and
wherein each of the plurality of driver apparatuses is configured to receive the data signal via the at least one signal cable and to process the data signal to produce a driving signal to drive a modulateable light source of the corresponding one of the plurality of luminaires, the driving signal having a higher power than the data signal, and the modulateable light source thereby producing modulated light.

27. The system according to claim 26, wherein the plurality of luminaires comprises at least a first type of luminaire light source technology and a second type of luminaire light source technology, and the plurality of driver apparatuses comprises at least one driver apparatus of a first type compatible with the first type of luminaire light source technology and at least one driver apparatus of a second type compatible with the second type of luminaire light source technology.

28. The system according to claim 26, wherein each of the plurality of luminaires comprises a respective receiver configured to receive modulated light.

29. The system according to claim 26, wherein at least one of the plurality of luminaires comprises at least one receiver configured to receive modulated light.

30. The system according to claim 26, wherein at least one of the plurality of driver apparatuses and at least one of the plurality of luminaires are provided in a single housing.

31. The system according to claim 26, wherein the at least one signal cable comprises a plurality of signal cables, and the plurality of driver apparatuses are connected to the signal providing apparatus by parallel connection of the signal cables.

32. The system according to claim 26, wherein the at least one signal cable comprises a plurality of signal cables, and the plurality of driver apparatuses are connected to the signal providing apparatus by parallel connection of the signal cables.

* * * * *

UNITED STATES PATENT AND TRADEMARK OFFICE
CERTIFICATE OF CORRECTION

PATENT NO. : 11,444,692 B2
APPLICATION NO. : 16/479888
DATED : September 13, 2022
INVENTOR(S) : Arne Rossius Page 1 of 1

It is certified that error appears in the above-identified patent and that said Letters Patent is hereby corrected as shown below:

On the Title Page

Item (74) Attorney, Agent, or Firm, please delete "Womble Bond Dickinson (US) LLP" and insert --SNELL & WILMER L.L.P.--.

In the Claims

At Column 22, Line 23, in Claim 31, please delete "The system according to claim 26, wherein the at least one signal cable comprises a plurality of signal cables, and the plurality of driver apparatuses are connected to the signal providing apparatus by parallel connection of the signal cables." and insert --The system according to claim 26, wherein the plurality of driver apparatuses are connected to the signal providing apparatus by series connection of the at least one signal cable.--.

Signed and Sealed this
First Day of November, 2022

Katherine Kelly Vidal
*Director of the United States Patent and Trademark Office*